United States Patent Office 3,594,337
Patented July 20, 1971

3,594,337
SYNTHETIC LATICES AND USE THEREOF
Joseph L. Shea, Short Hills, N.J., assignor to
Celanese Corporation
No Drawing. Filed Apr. 15, 1966, Ser. No. 542,720
Int. Cl. C08f 29/50
U.S. Cl. 260—17.4
14 Claims

ABSTRACT OF THE DISCLOSURE

A latex blend of a tripolymer of vinyl acetate, N-alkylol acrylamide, and ethyl acrylate with a tetrapolymer of methyl acrylate, ethyl acrylate, N-alkylolacrylamide, and unsaturated monocarboxylic or discarboxylic acid or anhydride provides, on application and heat curing, is an effective adhesive, especially for use in non-woven fabrics.

This invention relates broadly to improved synthetic latices and to a particular use thereof. The scope of the invention also includes method features.

Various latices or emulsions of homopolymers, and of binary, ternary and higher multi-component copolymers or interpolymers, heretofore have been employed or suggested for use in various domestic and industrial applications such as, for example, paint or coating compositions, adhesives or binders, textile-treating compositions, and for other purposes. Although these latices usually have many particular advantages as compared with other closeely related compositions, they often do not possess the desired level of effectiveness with respect to one or more properties, thereby restricting their field of utility. For example, when applied to fabrics to add body and weight, prevent raveling, cause filaments or fibers to adhere to each other (as in, for example, a nonwoven fabric or batt), etc., the resulting treated fabric may not have the desired degree of, for instance, washfastness, dry-cleanability, softness to the touch (i.e., good hand) and/or resistance to discoloration. Moreover, the applied coating and/or impregnant may not have sufficient resistance to common dry-cleaning solvents, e.g., perchloroethylene and Stoddard solvent.

It is a primary object of the present invention to provide improved synthetic latices or emulsions.

Another object of the invention is to provide latices, more particularly aqueous latices (aqueous emulsions or dispersions), that are capable of being effectively used in adhesively bonding together the filaments or fibers of nonwoven fabrics thereby to obtain fabrics that have exceptional durability during washing and dry-cleaning.

Still another object of the invention is to provide nonwoven fabrics of the kind described in the preceding paragraph, as well as a method of producing such fabrics.

Other objects of the invention will be apparent to those skilled in the art from the following more detailed description and from the appended claims.

The objects of the invention are attained by the production, and use in making a nonwoven fabric, of a latex or emulsion comprised at a blend of (I) a tripolymer and (II) a tetrapolymer in a weight ratio of from about 15% to about 35% (preferably about 25%) of the former to from about 85% to about 65% (preferably about 75%) of the later.

THE TRIPOLYMER OF (I)

The tripolymer component of the latex is broadly and specifically disclosed, and compositions comprising the tripolymer are claimed, in the copending application of Thomas Michael Guastavino, Ser. No. 351,824, filed Mar. 13, 1964, now abandoned, and which by this cross reference is made a part of the disclosure of the instant application.

As broadly described in the aforementioned Guastavino application, these tripolymer compositions are comprised of a copolymer (i.e., product of polymerization) of the following copolymerizable ingredients: a major proportion by weight of (A) at least one lower aliphatic ester, having terminal ethylenic unsaturation, of a lower saturated aliphatic monocarboxylic acid and a minor proportion by weight of (B) at least on polar monomer capable of forming a copolymer with the other copolymerizable ingredients and, as a coupling agent for the components (A) and (B)

(C) at least one $C_1$–$C_8$ alkyl ester of an $\alpha,\beta$-ethylenically unsaturated monocarboxylic acid.

The component (C) constitutes from about 25% to about 75%, preferably from about 40% to about 60%, by weight of the total amount of (B) and (C). Good results have been obtained when the component (C) constitutes approximately 50% by weight of the total amount of (B) and (C).

A particularly valuable sub-class of the above described tripolymer compositions is a copolymer comprised of the copolymerizable ingredients set forth in the preceding paragraph wherein the weight proportions of the ester (A) are from about 60 to 98% and those of the polar monomer (B) are from about 1 to 20%. Preferred compositions of this sub-class are those wherein the weight proportions of component (A) are from about 80 to 98% and those of component (B), from about 1 to 20%. The range of proportions of component (C) is the same as given in the preceding paragraph. The proportions of (A), (B) and (C) total 100 weight percent.

The more preferred tripolymer of (I) is one which is the product of polymerization of the following copolymerizable ingredients in approximately the specified weight proportions:

(A) from 80 to 98% vinyl acetate,
(B) from 1 to 10% of a polar monomer including an N-(lower alkylol)acrylamide and, as a coupling agent for the components of (A) and (B),
(C) ethyl acrylate in an amount corresponding to from about 40% to about 60% by weight of the total amount of (B and (C), the proportions of (A), (B) and (C) totaling 100%. In such tripolymer compositions the preferred N-(lower alkylol)-acrylamide is N-methylolacrylamide.

Especially useful in carrying the present invention into effect is a tripolymer which is the product of polymerization of the following copolymerizable ingredients in the approximate weight proportions specified: about 94–95% vinyl acetate, about 2% N-methylolacrylamide and about 3–4% ethyl acrylate.

With further reference to the broad description, previously set forth, of the tripolymer component of the latices or emulsions of this invention, the following illustrative examples of the terminally unsaturated esters embraced by the definition of copolymerizable ingredient (A) are given: vinyl acetate, propionate, butyrate, isobutyrate, valerate and caproate; and the corresponding allyl esters, especially when a small amount thereof is used in conjunction with a larger amount of a vinyl ester such as, for example, vinyl acetate.

Illustrative examples of polar monomers useful as the aforementioned copolymerizable ingredient (B) are the ethylenically unsaturated mono- and polycarboxylic acids, the anhydrides (i.e., available anhydrides) of said acids, and the unsubstituted and N-substituted amides of said acids. Other examples are acrylonitrile and α-substituted acrylonitriles and higher members of the homologous series of alkenyl- and substituted alkenylnitriles. More specific examples of such monomers are acrylic acid and the α-alkyl-substituted, especially the $C_1$–$C_8$ α-alkyl-substituted, acrylic acids, and, of the latter acids, preferably α-methylacrylic acid which is more commonly named as methacrylic acid; crotonic acid; α-methylisocrotonic acid (angelic acid); α,β-dimethylacrylic acid (tiglic acid); atropic acid; cinnamic acid; 2-hexenoic acid; 2,4-pentadienoic acid; itaconic, fumaric, maleic, citraconic, mesaconic and aconitic acids and the halogeno-(e.g., chloro-, bromo- and fluoro-) substituted derivatives of the said acids; maleic anhydride; citaconic anhydride; the unsubstituted amides and nitriles of the aforementioned mono- and polycarboxylic acids; and N-substituted amides [i.e., N-(mono, di- and tri-substituted) amides] obtained by reacting the amides of the aforementioned mono- and di-carboxylic acids and of aconitic acid with an aldehyde, e.g., formaldehyde and higher members of the homologous series, thereby to obtain, for example, N-mono- and dimethylol-substituted amides (usually named without reference to the position of the substituent), e.g., N-mono- and dimethylolacrylamides, -methacrylamides, etc.; and others that will be apparent to those skilled in the art from the foregoing illustrative examples. Preferably the polar monomer is one which is at least partly soluble in water or in the aqueous reaction mass containing the polar monomer (B). Mixtures of different polar monomers may be used, in any proportions, as desired or as conditions may require.

Illustrative examples of $C_1$–$C_8$ alkyl esters that may be employed as the coupling agent (C) in making the tripolymer are the methyl, ethyl and propyl through octyl (both normal and isomeric forms) esters of acrylic acid, the corresponding alkyl esters of α-methyl through α-pentyl-substituted acrylic acids, and the corresponding alkyl esters of α-phenylacrylic acids. Mixtures of such esters may be used, in any proportions, as the coupling agent as desired or as conditions may require, and especially mixtures wherein ethyl acrylate constitutes at least 50 mole percent or more of the coupling agent.

THE TETRAPOLYMER OF (II)

The tetrapolymer component of the latices of this invention is the product of polymerization of the following copolymerizable ingredients in approximately the specified weight proportions:

(a) from 25 to 45% methyl acrylate,
(b) from 50 to 70% ethyl acrylate,
(c) from 0.2 to 5% of an ethylenically unsaturated monocarboxylic or polycarboxylic acid (or equivalent amount of an available anhydride thereof), and
(d) from 1 to 10% of an N-(lower alkylol)acrylamide, the proportions of (a), (b), (c) and (d) totaling 100%. Preferably copolymerizable ingredient (c) constitutes from 0.5 to 2.0 weight percent of the total copolymerizable ingredients, and preferably it is an ethylenically unsaturated polycarboxylic acid, specifically itaconic acid. Preferably, too, copolymerizable ingredient (d) constitutes from 1.0 to 5.0 weight percent of the total copolymerizable ingredients, and preferably it is N-methylolacrylamide.

Illustrative examples of ethylenically unsaturated monocarboxylic and polycarboxylic acids (and available anhydrides thereof) that may constitute copolymerizable ingredient (c) have been given hereinbefore in the portion of this specification wherein illustrative examples were given of polar monomers that were useful as copolymerizable ingredient (B) in making the tripolymer. Advantageously an ethylenically unsaturated polycarboxylic acid, specifically itaconic acid, is used since better adhesion of the polymeric adhesive or binder to the substrate, more particularly filaments or fibers of a non-woven fabric, then seems to be obtained. As indicated hereinbefore, instead of an ethylenically unsaturated polycarboxylic acid one may use an ethylenically unsaturated monocarboxylic acid, specifically acrylic acid.

PREPARATION OF EMULSIONS OF POLYMERIC COMPONENTS OF THE BLEND

Ordinarily, the tripolymer and tetrapolymer components of the blend are individually prepared in the form of an aqueous dispersion or emulsion, and the resulting emulsions are blended together in the desired proportions to produce the synthetic latices or emulsions of the present invention.

This aspect of the invention will be described with particular reference to the preparation of the tripolymer component of the blend, although it will be understood by those skilled in the art that the same general principles are applicable to the preparation of the tetrapolymer.

In preparing the tripolymer the polymerization reaction is conveniently carried out in the presence of a polymerization catalyst, e.g., a peroxide catalyst or any other free-radical catalyst or catalyst system, with or without other catalytic influences. The chosen catalyst should function effectively at the reaction temperature employed and, in an aqueous system, should be at least partly soluble in water and/or in the monomeric mixture. Preferably there is used a catalyst such as a peroxide that is at least partly soluble in water. More specific examples of peroxide catalysts that may be employed are hydrogen peroxide, water-soluble inorganic per-salts such as the persulfates, perphosphates, perborates, etc., including the alkali-metal (sodium, potassium, lithium, etc.) and ammonium persulfates, perphosphates and perborates. Organic peroxides having at least some solubility in water or in the reaction mass are also useful, e.g., acetyl peroxide, benzoyl peroxide, tertiary-butyl hydroperoxide and others of similar characteristics. Illustrative examples of redox-catalyst systems that may be employed are such combinations as mixtures of hydrogen peroxide and an iron salt; hydrogen peroxide and zinc formaldehyde sulfoxylate or similar reducing agent; hydrogen peroxide and a titanous salt; an alkali-metal persulfate, e.g., potassium persulfate, and an alkali-metal bisulfate, e.g., sodium bisulfite; a bromate such as potassium bromate in combination with a bisulfite such as potassium bisulfite; and others known in the art.

The amount of polymerization catalyst employed may be widely varied, e.g., from about 0.5% to about 5%, more particularly from about 1% to about 2%, by weight of the total amount of copolymerizable monomers. Obviously, no more catalyst should be used than is required to obtain maximum conversion at lowest catalyst cost.

In forming the emulsion or dispersion there is used a dispersing agent or surfactant, more particularly a "water-soluble" (within which term is included "water-miscible") surfactant, which also may be designated as an emulsifier or wetting agent, or as a surface-tension depressant. Advantageously, and preferably, a non-ionic surfactant is employed.

Illustrative examples of non-ionic surfactants that may be employed include polyethoxyethanol derivatives of methylene-linked alkylphenols; sulfur-containing agents such as those made by condensing the required proportion of ethylene oxide with nonyl, dodecyl, tetradecyl, etc., mercaptants or with alkylthiophenols having alkyl groups of from 6 to 15 carbon atoms; ethylene oxide derivatives of long-chain carboxylic acids such as lauric, myristic, palmitic, oleic, etc., or mixtures of acids such as those present in tall oil; ethylene oxide condensates of long-chain alcohols such as octyl, decyl, lauryl or cetyl alcohols; and ethylene oxide derivatives of etherified or esterified polyhydroxy compounds having a hydrophobic hydrocarbon chain. The preferred non-ionic surfactant is a relatively long-chain alkylphenoxy(polyethoxy)ethanol, more particularly those having attached to the aromatic nucleus an alkyl group containing from 7 through about 12 carbon atoms. Mixtures of such alkylphenoxy(polyethoxy)ethanols with each other or with other non-ionic surfactants in any proportions may be used as desired or as conditions may require.

The amount of surfactant employed may be varied considerably, but ordinarily it is used in an amount corresponding to from about 2% to about 12%, more particularly from 4 to 10%, by weight, based on the total weight of the copolymerizable ingredients.

The surfactant aids in effecting emulsification of the monomers, in sustaining the polymerization reaction and in stabilizing the resulting dispersion.

Broadly described, the tripolymer and the tetrapolymer are individually prepared by copolymerizing, with the aid of a polymerization catalyst and at a temperature within the range of from about 40° C. to about 90° C., copolymerizable ingredients of the kind and in the weight proportions hereinbefore set forth. Emulsions, specifically aqueous emulsions, of the copolymers are individually formed by dispersing the copolymerizable ingredients of which the copolymer is constituted in water. The dispersing agent is a water-soluble surfactant, preferably a water-soluble non-ionic surfactant such as a relatively long-chain alkylphenoxy(polyethoxy)ethanol of the kind and in the amount previously mentioned. A polymerization catalyst or catalyst system is added to the reaction mixture initially and/or during the course of the reaction, and the catalyzed reaction mass is heated within the aforementioned 40°–90° C. temperature range, more particularly below about 75° C., and preferably within the range of from about 45° C. to about 65° C.

The emulsions may be prepared continuously, semi-continuously or by batch technique. For example, the copolymerizable ingredients may be added to the aqueous medium containing the dispersing agent at a rate such that throughout most, if not substantially all, of the polymerization reaction the concentration of the aforesaid ingredients or monomers is relatively low, e.g., not more than about 20 parts of monomers, preferably not above about 5 parts of monomers, per 100 parts of water, said parts being by weight. Preferably the copolymerizable ingredients (monomeric mixture) are added at a rate that approximates the rate of copolymerization thereof in the aqueous medium. The monomeric material is added until the concentration of copolymer in the aqueous medium has increased to the desired value, preferably until the copolymer content of the resulting emulsion is from about 40 to 60 weight percent and, in a still more preferred range, from about 40 to 50 weight percent.

The polymerization is preferably carried out within a pH range of from about 3 to about 8, and preferably at a pH of from 4 to 6. The emulsion is preferably adjusted to a pH of from 6.5 to 7.5 if it is not already within this pH range at the end of the reaction period. The pH may be controlled or adjusted by the use of acids or bases such as formic acid, sodium bicarbonate, sodium acetate, sodium phosphate, sodium hydroxide, ammonium hydroxide, etc.

Advantageously, the reaction is effected in a substantially oxygen-free atmosphere by operating in a closed reactor which has been purged with nitrogen or other inert gas to render it substantially free of oxygen. If desired, the reaction may be carried out in an atmosphere of an inert gas, e.g., by passing a stream of nitrogen, carbon dioxide or other inert gas through the reaction mass throughout the course of the reaction.

The time of the reaction will vary widely depending upon the particular equipment employed (e.g., continous, semi-continous or batch equipment), size of the total charge, particular monomers and other additives employed, particular viscosity and other properties desired, and other influencing factors. For example, the reaction time may vary from 2 to 10 hours or more.

In a manner similar to that described above and in the aforementioned Guastavino copending application Ser. No. 351,824 with reference to the preparation of a latex comprising an emulsion or dispersion, more particularly an aqueous emulsion or dispersion, of a tripolymer of the kind used in practicing the present invention, the tetrapolymer component of the compositions of this invention may be prepared. The tetrapolymer solids content of the resulting emulsions, like the emulsions of the tripolymer, generally constitutes from about 40% to about 60%, and preferably is between about 40% and about 50%, by weight of the emulsion.

The latices of the instant invention are prepared by merely blending together with conventional equipment and in known manner the individual tripolymer and tetrapolymer emulsions in proportions such that the final latex is a substantially homogeneous liquid (more particularly aqueous) dispersion of intimately associated tripolymer and tetrapolymer in a weight ratio of from about 15% to about 35% (preferably about 25%) of the former to from about 85% to about 65% (preferably about 75%) of the latter. Blending may be effected, for example, by agitating the mixture of tripolymer and tetrapolymer emulsions at ambient temperature in air. Or, one may blend the individual tripolymer and tetrapolymer emulsions at ambient temperature by passage through any of the commercially available automatic proportioning and mixing devices.

As an aid to curing, a curing catalyst advantageously is added to the compositions of the invention during blending of the individual components or at any other time prior to use of the latex. The curing catalyst may be, for example, any of the conventional acidic compounds used for this purpose, i.e., a compound that may be dissolved in water to yield a pH of less than 7, e.g., citric acid, tartaric acid, oxalic acid, succinic acid or anhydride or other organic acid or anhydride; or an acid salt such as ammonium chloride, magnesium chloride, an acid phosphate, or any Lewis acid. Preferably citric acid is employed as the curing catalyst. The amount of the curing catalyst may range, for example, from about 0.5% to about 8% (the latter in the case of certain catalysts) by weight of the total copolymer content of the latex. The effect of the curing catalyst is to lower the minimum required temperature and time of curing.

The latices of this invention contain fine particles of polymer; that is, the polymer particles therein generally have average diameters of 2 microns or less, e.g., from 0.1 to 1.5 microns. The latices may be marketed in such form or they may be modified by the incorporation of various modifiers or additives, e.g., pigments, dyes, fillers, plasticizers, stabilizing agents, and others commonly incorporated into synthetic latices. More specific examples of some of these modifiers are given in, for example, U.S. Pat. No. 3,010,929, which is assigned to the same assignee as the present invention.

In order that those skilled in the art may better understand how the present invention can be carried into effect, the following examples are given by way of illustration and not by way of limitation. All parts and percentages are by weight unless otherwise stated.

EXAMPLE 1

(A) Tripolymer formulation

| | Approx. percent |
|---|---|
| Vinyl acetate | 42.8 |
| Ethyl acrylate | 1.5 |
| Aqueous solution (60%) of N-methylolacryl amide | [1] 1.5 |
| Surfactant, specifically Triton X-405 [2] | 3.8 |
| Oxidizing component of catalyst system, specifically potassium persulfate | 0.1 |
| Reducing component of catalyst system, specifically sodium metabisulfite | 0.1 |
| Water (not including that which is present in the aqueos N-methylolacrylamide and in the surfactant) | 50.8 |

[1] 0.9 weight percent 100% N-methylolacrylamide.
[2] Available from Rohm and Haas Company, Philadelphia, Pa. It is octylphenoxy(polyethoxy)ethanol containing about 40 moles of combined ethylene oxide.

The emulsion of tripolymer is prepared as broadly described hereinbefore; and, more specifically, in essentially the same manner as is described in Example 1 of the aforementioned Guastavino copending application Ser. No. 351,824.

Typical preparations of emulsions using the formulation of Example 1 show a solids content of between about 46 and 48 weight percent, and a viscosity (Brookfiield RVF, No. 3 spindle, 20 r.p.m., 25° C.) of between about 50 and 300 c.p.s. A specific emulsion had a solids content of 46.2%; an unadjusted pH as initially prepared of 4.9 and a viscosity of 86 c.p.s.; and, after adjusting with 10% aqueous NaOH to a pH of 6.9, a viscosity of 80 c.p.s.

The viscosity of the emulsion may be varied, as desired or as conditions may require, by the addition of various modifying agents. Data on viscosity changes resulting from the addition of various modifiers are shown in a table formng a part of Example 1 of the aforementioned Guastavino copending application Ser. No. 351,824.

In the above formulation for the preparation of the emulsion of the tripolymer the percentage proportions there given, and which are based on the total charge, correspond to the following approximate percentages based on the monomers alone:

| | Approximate percent |
|---|---|
| Vinyl acetate | 94.7 |
| Ethyl acrylate | 3.3 |
| N-methylolacrylamide | 2.0 |
| | 100.0 |

(B) Tetrapolymer formulation

| | Percent |
|---|---|
| Methyl acrylate | 15.03 |
| Ethyl acrylate | 26.92 |
| Itaconic acid | 0.42 |
| Aqueous solution (60%) of N-methylolacrylamide | 1.45 |
| "Igepal CO-977" (surfactant [1]) | 1.07 |
| "Igepal CO-897" (surfactant [2]) | 2.69 |
| Potassium persulfate | 0.09 |
| Sodium metabisulfite | 0.09 |
| Sodium hydroxide [3] | 0.16 |
| Water (not including that which is present in the aqueous N-methylolacrylamide and in the surfactants) | 52.08 |

[1] "Igepal CO-977," a non-ionic surface-active agent, is a condensation product of nonylphenol with about 40 moles of ethylene oxide per mole of nonylphenol.
[2] "Igepal CO-897" differs from the other Igepal surfactant in that it is a condensation product of nonylphenol with about 50 moles of ethylene oxide per mole of nonylphenol.
[3] The sodium hydroxide is added at the completion of the reaction period in order to adjust the pH of the latex to about 7.0 and thereby improve its mechanical and storage stability.

The procedure is essentially the same as described under Example 1 and in the aforementioned Guastavino application. A delayed addition technique is followed. The temperature of polymerization is generally below 75° C., preferably 55°–65° C.; and the time of polymerization is usually from 2 to 8 hours, preferably from 3 to 5 hours. The monomers may be premixed, and the admixture then added to the reaction zone. The pH of the latex at the end of the reaction period, before pH adjustment, is usually from about 2 to 4. It is adjusted by the addition of aqueous NaOH to a pH of about 7.0. The final viscosity is about 400 cps., and the solids content is about 47%.

In the above formulation for the preparation of the emulsion of the tetrapolymer the percentage proportions there given, and which are based on the total charge, correspond to the following approximate percentages based on the monomers alone:

| | Approximate percent | |
|---|---|---|
| Methyl acrylate | 34–35, specifically | 34.7 |
| Ethyl acrylate | 61–64, specifically | 62.3 |
| Itaconic acid | 0.5–1.5, specifically | 1.0 |
| N-methylolacrylamide | 1.5–2.5, specifically | 2.0 |
| | | 100.0 |

Preparation of latices of the invention

The emulsions of the tripolymer and of the tetrapolymer are blended together to obtain a latex containing about 25% of the tripolymer and about 75% of the tetrapolymer. The relative proportions of the tripolymer and tetrapolymer latices required to obtain the aforementioned percentage proportions of the two polymers in the blend are calculated from the solids contents of each. A mixing vessel provided with a mechanical agitator is employed in producing a homogeneous blend of the two latices. The viscosity of the charge to the mixing vessel is very low, and blending is readily effected under moderate agitation. Blending can be done at any time before use, since the individual emulsions of which the final latex is comprised are mutually stable.

In the preferred technique for employing the latices of the invention, a curing catalyst (numerous examples of which have been given hereinbefore) is incorporated into the latex prior to its use. Preferably citric acid in a catalytic amount is used; and, more particularly, in an amount corresponding to about 1% by weight of the final latex. In the present example this is done by preparing a 50% aqueous solution of citric acid by dissolving one part of the acid in one part of warm water. This citric acid solution is then added with agitation to the uncatalyzed admixture in the weight ratio of 2 parts of the former to 98 parts of the latter, giving a catalyzed mix or blend containing about 1 weight percent of citric acid. This catalyzed latex is used as described in Example 4 as a binder for fibers of a nonwoven fabric material.

EXAMPLE 2

Same as in Example 1 with the exception that there is used in making a latex of the invention a tripolymer produced by the emulsion copolymerization of about 1665 parts vinyl acetate, 60 parts methyl methacrylate and 60 parts of a 60% aqueous solution of N-methylolacrylamide. The procedure in making the tripolymer is essentially the same as that employed in Example 1, the so-called "delayed addition" technique being employed in both cases. In this example, however, the time of the delayed addition is 2¼ hours as compared with 6 hours in Example 1. The reaction temperature is maintained for the most part at 56°–58° C., the peak temperature being 66° C. and the initial reaction temperature about 40° C. The finished emulsion contains about 45.8% solids.

EXAMPLE 3

In the formulation used in Example 1, the vinyl acetate, ethyl acrylate and N-methylolacrylamide yield a tripolymer which is the product of polymerization of the following copolymerizable ingredients in the approximate weight proportions specified (i.e., based on total monomers in the charge): about 94–95%, more particularly about 94.7%; vinyl acetate; about 3–4%, more particularly about 3.3%, ethyl acrylate; and about 1.5–2.5%, more particularly about 2%, N-methylolacrylamide.

This example differs from Example 1 in that the proportions of the same monomers are varied to yield a tripolymer having the following constitution (again based on proportions of starting monomers): about 96–97%, more particularly about 97.4%, vinyl acetate; about 2–3%, more particularly about 2.2%, ethyl acrylate; and about 1–1.5%, specifically 1.35%, N-methylolacrylamide. The properties of the final latex are similar to those of the final latex of Example 1.

EXAMPLE 4

A latex of this invention, more particularly a latex comprised of a catalyzed, specifically citric acid-catalyzed, aqueous dispersion of the blend of tripolymer and tetrapolymer of Example 1 is particularly useful as a binder for filaments or fibers of a nonwoven fabric material.

Three and six oz./sq. yard batts of 3-denier rayon fibers, having an average staple length of 1 9/16 inches, are prepared on a Rando-Webber unit, and then saturated with the latex of the invention on the Rando-Bonder unit. With each sample the vacuum extractor is varied in an effort to keep the deposited resin solids content constant. After impregnation, the samples are dried in a Ross gas-fired forced-air oven, using varying temperatures depending upon the weight of the sample. The 3 oz. samples are usually dried in one pass, while the 6 oz. samples require two passes. A day of conditioning at 70° F. and 65% relative humidity is allowed to lapse before checking the bonded weight.

The above-described "drying" of the emulsion-saturated or -impregnated nonwoven fabric or batt more properly may be designated as a drying and curing operation. This is because not only is the water component of the binder substantially completely removed therefrom by the heat treatment but the polymer or resin component is cured or slightly cross-linked because of the presence of the N-methylolacrylamide component. Consequently the binder adheres tenaciously to the fibers, and the nonwoven fabric resulting from impregnation of the web of filaments or fibers is made highly resistant to the action of water during washing and to attack by cleaning solvents during dry cleaning. Although, as indicated in the preceding paragraph, the temperature of drying and curing may be varied considerably, as may be required by particular circumstances, the maximum temperature is usually within the range of from about 250° F. to about 325° F. for periods ranging from 1 or 2 to 10 or 15 minutes, the longer periods being required at the lower temperatures and the shorter times at the higher temperatures.

For purpose of comparison corresponding samples are prepared using (a) 100% of the tetrapolymer emulsion, (b) 100% of the tripolymer emulsion and (c) a 50/50% tetrapolymer/tripolymer emulsion, these samples being designated, respectively, "TETRA," "TRI," and 50/50: TETRA/TRI" in tables which follow. In these same tables, nonwoven rayon fabrics prepared using the latex of this example are designated as "75/25:TETRA/TRI."

Table I, which follows, shows the unbonded weights, the bonded weights and the weight percent of binder in the fabric when each of the aforementioned binders are used.

TABLE I

| | | Unbonded weight | | Bonded weight, ozs. | Percent binder |
|---|---|---|---|---|---|
| Fiber | Binder | Ozs. | Gms. | | |
| 3 oz. rayon | TETRA | 2.99 | 42.3 | 4.32 | 35 |
| 6 oz. rayon | TETRA | 6.20 | 87.8 | 9.09 | [1] 46 |
| 3 oz. rayon | TRI | 3.00 | 42.6 | 3.46 | 15 |
| 6 oz. rayon | TRI | 5.96 | 84.5 | 7.55 | 26 |
| 3 oz. rayon | 50/50:TETRA/TRI | 3.00 | 42.4 | 4.11 | 37 |
| 6 oz. rayon | Same as above | 5.97 | 84.6 | 7.57 | 26 |
| 3 oz. rayon | 75/25:TETRA/TRI | 3.00 | 42.4 | 3.75 | 25 |
| 6 oz. rayon | Same as above | 6.01 | 85.1 | 7.30 | 21 |

[1] Failed on first wash.

In Table II are given the Instron tensile strengths in lbs./sq. yd. (i.e., Instron breaking value in pounds divided by the weight of the web) for the samples given in Table I both originally and, also, after three washings and three dry cleanings of two different samples taken from the same fabric for this purpose. Washing was done by putting the fabric through a standard automatic home washing machine using water at 120° F. and to which had been added one cup of a commercial detergent, mor particularly Tide detergent. The fabrics were washed and rinsed without being spun-dried. Drying was done at ambient temperature. The samples for dry cleaning were sent to a commercial dry-cleaning establishment.

Table II follows:

TABLE II

Instron tensile strengths

| | Binder | | | |
|---|---|---|---|---|
| Nonwoven fabric | TETRA | TRI | 50/50: TETRA/TRI | 75/25: TETRA/TRI |
| 3 oz. rayon: | | | | |
| Original | 8.34 | 10.7 | 10.13 | 10.92 |
| 3 W [1] | 8.92 | 8.96 | 9.13 | 10.68 |
| 3 DC [2] | 7.53 | 7.08 | 8.28 | 9.19 |
| 6 oz. rayon: | | | | |
| Original | 8.42 | 9.67 | 10.05 | 8.36 |
| 3 W | 8.86 | 6.95 | 8.59 | 7.95 |
| 3 DC | 7.86 | 5.10 | 7.47 | 7.19 |

[1] After 3 washes.
[2] After 3 dry cleanings.

In preparing the bonded nonwoven fabrics for which the binder content and the results of Instron tensile strengths originally and after washing and dry cleaning are given in Tables I and II, effort is made to provide the same level of binder in each sample. Unfortunately this is not achieved due to the processing techniques involved. Since the percent binder in the samples determines the tensile strength, the tensile strength of each sample was corrected by dividing each by a Binder Index. This is nothing more than the value obtained by dividing each binder percent by the lowest of that of all the samples, which is 15%. This reduces all tensile strengths by a factor dependent on the binder percent. To do this one must assume that the effect of the binder percent is linear and equal among the different binders. This is, of course, untrue but assists in evaluating relative strengths.

The results of Instron tensile strengths, corrected for percent binder content of the nonwoven rayon fabrics, in lbs./oz./sq. yd. are given in Table III. This value is the Instron value for breaking strength in pounds divided by the weight of the nonwoven fabric in ozs./sq. yd.

Table III follows:

TABLE III

Tensile strength (lbs./oz./sq. yd.) corrected for percent binder

| Nonwoven fabric | Binder | | | |
|---|---|---|---|---|
| | TETRA | TRI | 50/50: TETRA/TRI | 75/25: TETRA/TRI |
| Binder index | 2.33 | 1.0 | 2.47 | 1.69 |
| 3 oz. rayon: | | | | |
| Original | 3.58 | 10.7 | 4.10 | 6.54 |
| 3 W | 3.83 | 8.96 | 3.70 | 6.40 |
| 3 DC | 3.23 | 7.08 | 3.35 | 5.51 |
| Binder index | 3.07 | 1.73 | 1.73 | 1.4 |
| 6 oz. rayon: | | | | |
| Original | 2.74 | 5.57 | 5.79 | 5.97 |
| 3 W | 2.88 | 4.02 | 4.96 | 5.67 |
| 3 DC | 2.56 | 2.94 | 4.30 | 5.14 |

The approximate percentage changes in the tensile strength values, corrected for the percent binder, from that of the original nonwoven fabrics (i.e., before washing and dry cleaning) as compared with that of the said fabrics after three washings and dry cleanings are given in Table IV, which follows.

TABLE IV

Approximate percentage changes in tensile strengths after three washes and dry cleanings

| Nonwoven fabric | Binder | | | |
|---|---|---|---|---|
| | TETRA | TRI | 50/50: TETRA/TRI | 75/25: TETRA/TRI |
| 3 oz. rayon: | | | | |
| 3 W | 6 | 16 | 9 | 2 |
| 3 DC | 9 | 33 | 18 | 5 |
| 6 oz. rayon: | | | | |
| 3 W | 5 | 27 | 14 | 5 |
| 6 DC | 6 | 47 | 25 | 13 |

The surprising and unobvious synergistic effect in obtaining superior durability upon laundering and dry cleaning by using a latex of the kind which this invention is concerned in producing a nonwoven fabric will be apparent to those skilled in the art from the foregoing data, and especially from that which is presented in Tables III and IV.

The latices of the invention may be employed as a binder or treating for nonwoven or other fabrics of natural fibers such as, for example, cotton, wool, flax, ramie, jute and silk; or of synthetic fibers such as, for instance, nylon, polyester, polyacrylonitrile, modacrylic, polyolefin (e.g., polypropylene), cellulose acetate, rayon (regenerated cellulose), and others known in the art, or mixtures of any two or more of such fibers.

More specific examples of thermoplastic synthetic fibers are linear polyesters such as polyethylene terephthalate; fibers of copolymers of the various vinyl and vinylidene compounds such as fiber-forming vinyl chloride/vinyl acetate copolymers; or fibers of copolymers of vinylidene chloride and acrylonitrile and/or other ethylenically unsaturated monomers. Organic esters of cellulose other than cellulose acetate may be employed, e.g., cellulose propionate, cellulose butyrate, cellulose acetate propionate, cellulose acetate butyrate, and the like. The cellulose ester may be, for instance, acetone-soluble secondary cellulose acetate having an acetyl value (calculated as combined acetic acid) of less than 59%, more particularly from 50 to 58%, and most preferably from 54 to 56%; or a cellulose triester such as cellulose triacetate having an acetyl value of 59% or higher, e.g., up to 62.5%.

The latices of the invention are especially applicable and useful as a durable, cohesive binder for nonwoven fabrics wherein the fibers include a substantial amount, e.g., 25% or more, and preferably a major or predominant amount (more than 50%) by weight of any of the various rayons (including cuprammonium rayons) that are commercially available.

The latices of this invention or the individual emulsions used in their preparation may be thickened, as desired or as may be required for a particular service application, by incorporating a thickening agent in the latex. As thickening agents there may be used, for example, "2% Methocel 65 HG 4000," which is a 2% solution of a methylether-substituted cellulose in water, and is available from Dow Chemical Company, Midland, Mich.; or sodium polyacrylate (a polymer) available under the designation "Acrysol ASE-60" from Rohm and Haas Company, Philadelphia, Pa. Illustrative examples of other thickening agents that may be employed are polyacrylamide, polyvinyl alcohol, polyvinylpyrrolidone, hydroxyethyl cellulose, carboxymethyl cellulose, gum arabic, soluble starch, glue, gelatin, and sodium alginate.

The thickening agent may be added in any amount that may be required to bring the emulsion to a desired viscosity, e.g., within the range of from about 300 (if the latex otherwise is below this value) to about 3000 cps. or higher, more particularly from about 500 to about 2000 cps., in order to meet the requirements of a particular end use.

The inclusion of plasticizers in the latices of this invention is not precluded, for instance plasticizers of the kinds and in the amounts set forth in the aforementioned Guastavino copending application.

From the foregoing description it will be seen that the present invention not only provides latices or emulsions having unobvious properties and which comprise an aqueous blend or intimate association of a particular and critical range of proportions of certain defined tripolymers (terpolymers) and tetrapolymers, but it also provides compositions, heat-cured in situ, comprised of an intimate association of the tripolymer and tetrapolymer in approximately the same proportions as they are present in the blend. The term "intimate association," as used herein and in the appended claims, is intended to include within its meaning not only a physical admixture of th etripolymer and tetrapolymer in the heat-cured polymeric composition, but also a chemical combination between them, or both a physical admixture and one wherein some chemical reaction has occurred. Although it cannot be established with certainty, it is believed that at least some chemical reaction or interpolymerization occurs between the tripolymer and the tetrapolymer during the in situ drying and curing process, and/or with at least certain substrates, especially those such as natural and regenerated celluloses, cellulose esters, fiber-forming cellulose ethers and the like.

It will also be seen that the invention provides a nonwoven fabric material wherein the fibers thereof are adhesively bonded together with a heat-cured composition comprising an intimate association of a tripolymer and a tetrapolymer of the kind hereinbefore fully described and in the critical weight proportions previously set forth. Thus the fibers may be any of the thermoplastic fibers, such as any of those hereinbefore mentioned by way of example, but preferably are those comprising or consisting essentially of synthetic cellulosic fibers, and particularly those which include or consist essentially of rayon fibers. Natural cellulosic fibers also may be employed in making the nonwoven fabrics or batts, alone or in combination with synthetic cellulosic fibers and/or non-cellulosic fibers in any proportions.

It will also be seen from the foregoing description that the instant invention provides a method of producing a nonwoven fabric material which is resistant to tensile-strength deterioration upon washing or dry cleaning, and which comprises adhesively bonding together the fibers of the said fabric material with an intimate association of the above-described heat-treated composition.

It will also be understood by those skilled in the art that the foregoing description is given merely by way of illustration and not by way of limitation, and that many variations may be made therein without departing from the spirit of the invention.

The embodiments of the invention in which an exclusive property or privilege is claimed are defined as follows:

1. Emulsion consisting essentially of an aqueous blend of (I) a tripolymer and (II) a tetrapolymer in a weight ratio of from about 15% to about 35% of the former to from about 85% to about 65% of the latter, said tripolymer of (I) being the product of polymerization of the following copolymerizable ingredients in approximately the specified weight proportions:

(A) from 80 to 98% vinyl acetate,
(B) from 1 to 10% of a polar monomer including an N-(lower alkylol)acrylamide and, as a coupling agent for the components of (A) and (B),
(C) ethyl acrylate in an amount corresponding to from about 40% to about 60% by weight of the total amount of (B) and (C), the proportions of (A), (B) and (C) totaling 100%; and said tetrapolymer of (II) being the product of polymerization of the following copolymerizable ingredients in approximately the specified weight proportions:

(a) from 25 to 45% methyl acrylate,
(b) from 50 to 70% ethyl acrylate,
(c) from 0.2 to 5.0% of an ethylenically unsaturated monocarboxylic acid, polycarboxylic acid, or an equivalent amount of an anhydride of said acids; and
(d) from 1.0 to 5.0% of an N-(lower alkylol)acrylamide, the proportions of (a), (b), (c) and (d) totaling 100%.

2. Emulsion as in claim 1 wherein the tripolymer of (I) and the tetrapolymer of (II) are employed in a weight ratio of from about 25% of the former to about 75% of the latter, the N-(lower alkylol)acrylamide in both the tripolymer and the tetrapolymer is N-methylolacrylamide, and the ethylenically unsaturated polycarboxylic acid in the tetrapolymer is a member of the group consisting of itaconic acid, acrylic acid and methacrylic acid.

3. Emulsion as in claim 1 wherein the tripolymer of (I) is the product of polymerization of the following copolymerizable ingredients in the approximate weight proportions specified: about 94–95% vinyl acetate, about 1.5–2.5% N-methylolacrylamide and about 3–4% ethyl acrylate.

4. Emulsion as in claim 1 wherein the tetrapolymer of (II) is the product of polymerization of the following copolymerizable ingredients in the following approximate weight proportions specified: about 34–35% methyl acrylate, about 61–64% ethyl acrylate, about 0.5–1.5% itaconic acid and about 1.5–2.5% N-methylolacrylamide.

5. Emulsion as in claim 1 wherein the tripolymer of (I) and the tetrapolymer of (II) are employed in a weight ratio of from about 25% of the former to about 75% of the latter; the tripolymer of (I) is the product of polymerization of the following copolymerizable ingredients in the approximate weight proportions specified: about 94–95% vinyl acetate, about 1.5–2.5% N-methylolacrylamide and about 3–4% ethyl acrylate; and the tetrapolymer of (II) is the product of polymerization of the following copolymerizable ingredients in the approximate weight proportions specified: about 34–35% methyl acrylate, about 61–64% ethyl acrylate, about 0.5–1.5% itaconic acid and about 1.5–2.5% N-methylolacrylamide.

6. An emulsion as in claim 1 which additionally contains from 2 to 12% by weight, based on the total weight of the defined blend of copolymers, of a water-soluble non-ionic surfactant.

7. An emulsion as in claim 6 wherein the non-ionic surfactant is at least one long-chain alkylphenoxy(polyethoxy)ethanol.

8. An emulsion as in claim 7 wherein the non-ionic surfactant is at least one nonylphenoxy(polyethoxy)ethanol.

9. A nonwoven fabric material wherein the fibers thereof are adhesively bonded together with a heat-cured composition consisting essentially of an intimate association of a tripolymer and a tetrapolymer in a weight ratio of from about 15% to about 35% of the former to from about 85% to about 65% of the latter, said tripolymer and tetrapolymer being the polymerization products defined in claim 1.

10. A nonwoven fabric material as in claim 9 wherein the fibers thereof comprise synthetic cellulosic fibers.

11. A nonwoven fabric material as in claim 10 wherein the synthetic cellulosic fibers thereof include rayon fibers.

12. A nonwoven fabric material as in claim 9 wherein the fibers thereof consist essentially of rayon fibers that are adhesively bonded together with a heat-cured composition comprised of an intimate association of a tripolymer and a tetrapolymer in a weight ratio of from about 25% of the former to about 75% of the latter, said tripolymer and tetrapolymer being the polymerization products defined in claim 1.

13. The method of producing a nonwoven fabric material which is resistant to tensile-strength deterioration upon washing or dry cleaning, said method comprising adhesively bonding together the fibers of the said fabric material with a heat-cured composition consisting essentially of an intimate association of a tripolymer and a tetrapolymer in a weight ratio of from about 15% to about 35% of the former to from about 85% to about 65% of the latter, said tripolymer and tetrapolymer being the polymerization products defined in claim 1.

14. The method as in claim 13 wherein the fibers of the said fabric material comprise synthetic cellulosic fibers.

References Cited

UNITED STATES PATENTS

| | | | |
|---|---|---|---|
| 2,637,712 | 5/1953 | Upton | 260—29.6 |
| 2,884,126 | 4/1959 | Ulrich | 206—59 |
| 2,976,203 | 3/1961 | Young et al. | 154—140 |
| 3,080,333 | 3/1963 | Kray et al. | 260—29.6 |
| 3,081,197 | 3/1963 | Adelman | 117—140 |
| 3,157,562 | 11/1964 | Kine et al. | 161—170 |
| 3,301,809 | 1/1967 | Goldberg et al. | 260—29.6 |
| 3,361,695 | 1/1968 | Wilhelm et al. | 260—29.6 |
| 3,222,419 | 12/1965 | Jubilee et al. | 260—29.6UX |
| 3,231,533 | 1/1966 | Garrett et al. | 260—29.6 |
| 3,240,740 | 3/1966 | Knapp et al. | 260—29.6 |
| 3,262,985 | 7/1966 | Müller et al. | 260—80.3 |
| 3,361,695 | 1/1968 | Wilhelm et al. | 260—29.6 |
| 3,288,740 | 11/1966 | Maeder et al. | 260—29.6 |
| 3,365,410 | 1/1968 | Wesslau et al. | 260—29.6 |
| 3,380,851 | 4/1968 | Lindemann et al. | 117—140 |

WILLIAM H. SHORT, Primary Examiner

E. A. NIELSEN, Assistant Examiner

U.S. Cl. X.R.

117—143, 145; 161—170; 260—29.6, 901